Patented May 29, 1945

2,376,964

UNITED STATES PATENT OFFICE 2,376,964

PROCESSES FOR THE PRODUCTION OF VINYL ESTERS OF ORGANIC ACIDS

Bertil Sixten Groth and Stig Börje Henning Johanson, Ornskoldsvik, Sweden

No Drawing. Application December 10, 1941, Serial No. 422,458. In Sweden January 21, 1941

9 Claims. (Cl. 260—498)

It is known to produce esters of vinyl alcohol by the addition of carboxylic acids (especially the lower fatty acids or their derivatives) to acetylene, in the presence of catalytically active substances, preferably mercury compounds. It has also been found, especially when working in the liquid phase, that a considerable increase of the catalytic effect may be attained by addition of certain substances, which may be said to have an action as catalyst activators. When using such activators the reaction temperature may be lowered down to 15–30° C., whereby the formation of alkylidene diacetate and the polymerization of the monomeric compounds which tend to occur at higher temperatures is considerably reduced. Moreover, the quantity of the catalyst required is considerably smaller than otherwise.

It is known to use boron fluoride as activator and also to use boron fluoride together with hydrofluoric acid, in which case the catalytic effect is still higher and the lifetime of the catalyst is increased. Furthermore, instead of using boron fluoride and hydrofluoric acid, it has been proposed to use a mixture of boric acid (or its anhydride) and hydrofluoric acid.

Surprisingly it has now been found that in the catalytic production of vinyl esters in the above-mentioned manner fluorine compounds of elements of quite another kind than boron may also be used as catalysts and/or activators, and with still better results.

We have ascertained that especially suitable for this purpose are fluorine compounds of such elements (M) as are capable of reacting with fluorine to form oxygen-containing fluoric acids (also called oxy-fluorides or hydroxy-fluorides), for instance $HMF_2O_2$, and/or oxygen-free hydrofluoric acids (also called acid fluorides), for instance $HMF_6$. According to Werner the foregoing acids may be considered as coordination compounds having the following formulae:

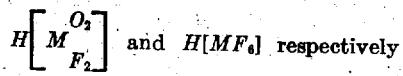

and $H[MF_6]$ respectively in which M has a valency of five. The general formulae for these complex compounds are $H_xMF_yO_z$ and $H_xMF_y$ respectively, in which M is an element belonging to any of the groups IV–VI in the Periodic System, H is hydrogen which may partially or wholly be replaced by metals, F is fluorine, and O is oxygen.

These acids may be considered as coordination compounds of the following types:

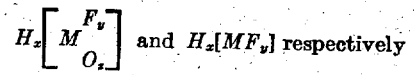

and $H_x[MF_y]$ respectively in which formulae the following relation exists between the $x$, $y$, $z$ subscripts and the main valency value $n$ of the element M:

$$x+n=y+2z$$

Thus, according to our present invention, the production of vinyl esters by the reaction of a carboxylic acid compound (i. e., a carboxylic acid or a derivative thereof containing a free carboxylic acid group) with an acetylene hydrocarbon is carried out in the presence of a catalyst comprising a fluorine compound containing an element selected from groups IV, V and VI of the Periodic System.

In carrying out said reaction it is preferred to use fluorine compounds of the general formulae $H_xMF_yO_z$ or $H_xMF_y$ as described above. As examples of such fluoric acids and salts thereof, there may be mentioned mono-, di- and hexafluorophosphoric acids with the formulae $H_2POF_3$ $HPF_2O_2$ and $HPF_6$, and similar compounds containing arsenic, for instance salts of fluoroarsensic acid: $K_2AsF_7$ and $KAsF_4O$.

Other elements which are capable of forming fluoric acids and/or salts of the above-mentioned types are antimony, bismuth, titanium, zirconium, vanadium, niobium, tantalum, chromium, molybdenum and tungsten.

In the catalytic synthesis of vinylesters according to the present invention, other compounds preferably are also present. Thus mercury, cadmium, and zinc or other metal compounds, for instance mercuric oxide, may be added; such compounds reacting with the fluoric and hydrofluoric acids of the type described to form salts thereof.

We have discovered that the metal salts of said acids, especially the mercury salts, are good catalysts for the addition of carboxylic acid compounds to acetylene hydrocarbons. The fluoric acid radical of the catalyst need not necessarily be a unitary compound, but it may be composed of different fluoric acids of one or more elements of the above-mentioned kind. Further, it may be preferred to use only a single salt, for instance a mercury salt or another metal salt of said acids, or instead a mixture of two or more of said salts.

For production of vinyl esters according to the invention, the catalyst or catalyst mixture may suitably be dispersed or dissolved in the acid which is to be reacted with the acetylene hydrocarbon, for instance acetic acid. Said acetylene hydrocarbon is then introduced into the solution or dispersion at normal atmospheric pressure, (or if desired, at reduced or increased pressure) and at normal room temperature, (or if desired, at a higher or a lower temperature), until the reaction of the required quantity of the acetylene hydrocarbon has taken place, or until the catalyst has lost its activity.

Another procedure is to employ the catalyst absorbed in a porous substance which is dispersed in the reaction liquor, or over which are passed the vapours of the carboxylic acid compound in admixture with the acetylene hydrocarbon. Examples of suitable porous substances are, for instance, charcoal, active carbon and silica gel.

The process may be carried out continually or intermittently.

The production of the catalytically-acting hydrofluoric acid salt or salt mixture may be carried out in any suitable manner, and need not necessarily be effected separately in advance. Thus, the formation of the catalytic agent may wholly or partially take place in the reaction mixture itself, such as by reaction between the desired components. Alternatively, complexes derived from components separately prepared apart from the reaction liquor may be employed as catalysts.

A generally practicable procedure is to cause concentrated hydrofluoric acid to react with the oxide or hydroxide of the selected element (as for instance, an oxide of phosphorus or of arsenic), separately or in the reaction solution. For instance, when phosphorus is chosen as the element, the preparation of the catalyst is well illustrated by the action of hydrofluoric acid (40%) upon phosphorus pentoxide. In this reaction, preferably a mercury compound or another metal compound (for instance an oxide) which is capable of easily reacting with the fluoric acid, is added, either from the beginning or, especially in case of using difficultly soluble oxides, first when the fluoric acid has been formed.

The reaction may also be carried out in the presence of a small quantity of a solvent. For instance, a quantity of the acid which is to be added to the acetylene hydrocarbon or a quantity of its anhydride (e. g., acetic anhydride), may be employed for the absorption of water formed in the reaction. This is of advantage since it is preferred to work in a substantially anhydrous medium, if possible. It is therefore also preferable to add an acid anhydride in cases where the catalyst is formed directly in the vinyl ester reaction solution, especially if for that purpose a more or less concentrated water solution of hydrofluoric acid is used instead of anhydrous hydrogen fluoride gas.

It is also possible to start from the fluoride of the element in question and to cause this to react with hydrogen fluoride, either anhydrous or dissolved in water or another solvent. In order to avoid the necessity for a separate production of hydrogen fluoride it is possible to cause a fluoride to react with the corresponding quantity of a strong acid, for instance sulphurous acid, in the presence of the oxide or hydroxide of the element (M), and if desired in the presence of a solvent, for instance a quantity of the carboxylic acid (or its anhydride), to be reacted with acetylene, and to carry out the conversion with a suitable compound of mercury or another metal before or after the separation of the sulphate formed.

Instead of the oxide or hydroxide another compound of the element, for instance a salt thereof, such as a metaphosphate, may advantageously be used in the foregoing reaction.

Hydrogen fluoride may be added or be present in excess of that required by the formulae $H_xMF_yO_z$ and $H_xMF_y$, respectively.

Without in any way intending to restrict the scope of the invention, it is described in more detail in the following examples, in which the parts are parts by weight.

Example 1

To 200 parts of concentrated acetic acid were added 50 parts acetic anhydride, 1 part of phosphorus pentoxide and 5 parts of hydrofluoric acid of 40% concentration whereupon the mixture was heated to about 75° C., for one hour with stirring. Thereupon 2 parts of mercuric oxide were added and the heating continued at 75° C. during one hour.

The mixture was thereupon cooled to 50° C. and acetylene was introduced while stirring vigorously. The reaction was provided with a stirring device inserted therein with a gas tight connection and with a reflux cooler. The acetylene was rapidly absorbed with evolution of heat, so that the vessel had to be cooled to prevent the temperature from rising to over 50° C. After about 2 hours the absorption of acetylene was finished. Thereupon 5 parts of anhydrous sodium acetate were added, the mixture was stirred during 30 minutes, and was then subjected to distillation at a pressure of 100 mm. Hg. The distillate was fractionated at normal pressure and a yield of 66% of vinyl acetate obtained, calculated on the quantity of acetylene (60 parts), which had been absorbed.

Example 2

To 1000 parts of acetic acid were added 100 parts of acetic anhydride, 6 parts pyroarsenic acid, 20 parts of hydrofluoric acid of 40% concentration and 2.8 parts of mercuric oxide. The solution was cooled down to 18° C. and at this temperature acetylene was introduced while stirring vigorously. After 7 hours the solution had absorbed 370 parts of acetylene and the introduction thereof was discontinued. Anhydrous sodium acetate (5 parts) were then added, and the distillation was carried out as described in Example 1. A yield of 78% of vinyl acetate was obtained, calculated on the quantity of acetylene which had been absorbed.

Having now particularly described the nature of our invention and the manner of its operation what we claim is:

1. A process for the catalytic production of vinyl esters, comprising reacting an acetylene hydrocarbon with a compound containing a free carboxylic group, in the presence of a mercury salt of a fluorophosphoric acid.

2. A process for the catalytic production of vinyl esters, comprising reacting an acetylene hydrocarbon with a compound containing a free carboxylic group, in the presence of a mercury salt of a fluoroarsenic acid.

3. A process for the catalytic production of vinyl esters, comprising preparing a liquid mixture containing a compound having a free carboxylic group, and a mercury salt of an acid fluorine compound having at least one phosphorus atom, and then introducing acetylene into said liquid mixture.

4. A process for the catalytic production of vinyl esters, comprising preparing a liquid mixture containing a compound having a free carboxylic group, and a mercury salt of an acid fluorine compound having at least one arsenic atom, and then introducing acetylene into said liquid mixture.

5. A process for the catalytic production of vinyl esters, comprising preparing a liquid mixture containing a carboxylic acid compound having a free carboxylic group, the anhydride of said carboxylic acid compound, an oxide of mercury, and an acid fluorine compound having at least one atom of phosphorus and capable of reacting with said oxide of mercury, and then introducing acetylene into said liquid mixture.

6. A process for the catalytic production of vinyl esters, comprising preparing a liquid mixture containing a carboxylic acid compound having a free carboxylic group, the anhydride of said carboxylic acid compound, an oxide of mercury, and an acid fluorine compound having at least one atom of arsenic and capable of reacting with said oxide of mercury, and then introducing acetylene into said liquid mixture.

7. A process for the catalytic production of vinyl acetate, comprising preparing a liquid mixture containing acetic acid, acetic anhydride, mercuric oxide, and a fluorine compound having at least one phosphorus atom and capable of forming a salt with said mercuric oxide, and then introducing acetylene into said liquid mixture.

8. A process for the catalytic production of vinyl acetate, comprising preparing a liquid mixture containing acetic acid, acetic anhydride, mercuric oxide, and a fluorine compound having at least one arsenic atom and capable of forming a salt with said mercuric oxide, and then introducing acetylene into said liquid mixture.

9. A process for the catalytic production of vinyl esters, comprising reacting an acetylene hydrocarbon with a compound containing a free carboxylic group, in the presence of (a) a mercury compound, and (b) a fluorine compound containing an element selected from the class consisting of phosphorus and arsenic.

BERTIL SIXTEN GROTH.
STIG BÖRJE HENNING JOHANSON.

CERTIFICATE OF CORRECTION.

Patent No. 2,376,964.                                    May 29, 1945.

BERTIL SIXTEN GROTH, ET AL.

It is hereby certified that error appears in the printed specification of the above numbered patent requiring correction as follows: Page 1, second column, line 19, for "$H_2POF_3$" read --$H_2PFO_3$--; page 2, second column, line 12, after "reaction" insert the word --vessel--; and that the said Letters Patent should be read with this correction therein that the same may conform to the record of the case in the Patent Office.

Signed and sealed this 11th day of September, A. D. 1945.

Leslie Frazer (Seal)                                First Assistant Commissioner of Patents.

one atom of phosphorus and capable of reacting with said oxide of mercury, and then introducing acetylene into said liquid mixture.

6. A process for the catalytic production of vinyl esters, comprising preparing a liquid mixture containing a carboxylic acid compound having a free carboxylic group, the anhydride of said carboxylic acid compound, an oxide of mercury, and an acid fluorine compound having at least one atom of arsenic and capable of reacting with said oxide of mercury, and then introducing acetylene into said liquid mixture.

7. A process for the catalytic production of vinyl acetate, comprising preparing a liquid mixture containing acetic acid, acetic anhydride, mercuric oxide, and a fluorine compound having at least one phosphorus atom and capable of forming a salt with said mercuric oxide, and then introducing acetylene into said liquid mixture.

8. A process for the catalytic production of vinyl acetate, comprising preparing a liquid mixture containing acetic acid, acetic anhydride, mercuric oxide, and a fluorine compound having at least one arsenic atom and capable of forming a salt with said mercuric oxide, and then introducing acetylene into said liquid mixture.

9. A process for the catalytic production of vinyl esters, comprising reacting an acetylene hydrocarbon with a compound containing a free carboxylic group, in the presence of (a) a mercury compound, and (b) a fluorine compound containing an element selected from the class consisting of phosphorus and arsenic.

BERTIL SIXTEN GROTH.
STIG BÖRJE HENNING JOHANSON.

CERTIFICATE OF CORRECTION.

Patent No. 2,376,964. May 29, 1945.

BERTIL SIXTEN GROTH, ET AL.

It is hereby certified that error appears in the printed specification of the above numbered patent requiring correction as follows: Page 1, second column, line 19, for "$H_2POF_3$" read --$H_2PFO_3$--; page 2, second column, line 12, after "reaction" insert the word --vessel--; and that the said Letters Patent should be read with this correction therein that the same may conform to the record of the case in the Patent Office.

Signed and sealed this 11th day of September, A. D. 1945.

Leslie Frazer (Seal) First Assistant Commissioner of Patents.